US008428258B2

(12) United States Patent
Quan

(10) Patent No.: US 8,428,258 B2
(45) Date of Patent: *Apr. 23, 2013

(54) METHOD AND APPARATUS FOR PROVIDING CONTENT CONTROL VIA DETECTION OF MODIFICATIONS TO A SIGNAL

(75) Inventor: Ronald Quan, Cupertino, CA (US)

(73) Assignee: Rovi Technologies Corporation, Santa Clara, CA (US)

(*) Notice: Subject to any disclaimer, the term of this patent is extended or adjusted under 35 U.S.C. 154(b) by 1056 days.

This patent is subject to a terminal disclaimer.

(21) Appl. No.: 12/150,901

(22) Filed: Apr. 30, 2008

(65) Prior Publication Data

US 2008/0276325 A1 Nov. 6, 2008

Related U.S. Application Data

(60) Provisional application No. 60/927,223, filed on May 2, 2007.

(51) Int. Cl.
*G06F 21/00* (2006.01)

(52) U.S. Cl.
USPC .............................................. 380/203; 726/26

(58) Field of Classification Search ................ 726/2, 16, 726/21, 26–33; 380/200–204
See application file for complete search history.

(56) References Cited

U.S. PATENT DOCUMENTS 4,533,938 A 8/1985 Hurst
4,577,216 A 3/1986 Ryan
4,626,890 A 12/1986 Ryan
4,631,603 A 12/1986 Ryan
4,695,901 A 9/1987 Ryan
4,727,412 A 2/1988 Fearing et al.
4,819,098 A 4/1989 Ryan
4,907,093 A 3/1990 Ryan
4,914,694 A 4/1990 Leonard et al.
4,937,679 A 6/1990 Ryan
5,130,810 A 7/1992 Ryan
5,157,510 A 10/1992 Quan et al.
5,194,965 A 3/1993 Quan et al.
5,315,448 A * 5/1994 Ryan ............................... 360/60

(Continued)

FOREIGN PATENT DOCUMENTS

GB 2 396 767 B 9/2004
GB 2 387 497 B 12/2004

(Continued)

OTHER PUBLICATIONS

International Search Report for International application No. PCT/US2008/005708, mailed Oct. 7, 2008, 1 page.

*Primary Examiner* — Beemnet Dada
*Assistant Examiner* — John B King
(74) *Attorney, Agent, or Firm* — George B. Almeida

(57) ABSTRACT

A method and apparatus is provided for generating or providing any of various types of modifications purposely made to generally known signals, waveforms, conditions, functions, etc. The modifications are sensed, read, detected or interpreted to provide a content control command indicative of the difference between the original signal, waveform, condition, functions, etc., and the modified signal, waveform, condition, function, etc. The content control command may be used to provide content control for a content control system, which in turn may provide control of a selected compliant device.

28 Claims, 4 Drawing Sheets

U.S. PATENT DOCUMENTS

| | | | |
|---|---|---|---|
| 5,479,268 | A | 12/1995 | Young et al. |
| 5,583,936 | A | 12/1996 | Wonfor et al. |
| 5,625,691 | A | 4/1997 | Quan |
| 5,633,927 | A | 5/1997 | Ryan et al. |
| 5,748,733 | A | 5/1998 | Quan |
| 5,784,523 | A | 7/1998 | Quan et al. |
| 6,188,832 | B1 | 2/2001 | Ryan |
| 6,222,978 | B1 | 4/2001 | Hirai |
| 6,268,889 | B1 | 7/2001 | Koori |
| 6,285,765 | B1 | 9/2001 | Quan |
| 6,327,422 | B1 | 12/2001 | Quan et al. |
| 6,374,388 | B1 * | 4/2002 | Hinch .......................... 714/799 |
| 6,381,747 | B1 | 4/2002 | Wonfor et al. |
| 6,404,889 | B1 | 6/2002 | Ryan et al. |
| 6,501,842 | B2 | 12/2002 | Quan |
| 6,516,132 | B1 | 2/2003 | Wrobleski et al. |
| 6,542,609 | B1 | 4/2003 | Ryan et al. |
| 6,600,873 | B1 | 7/2003 | Brill et al. |
| 6,836,549 | B1 | 12/2004 | Quan et al. |
| 7,015,973 | B2 | 3/2006 | Kim |
| 7,039,294 | B2 | 5/2006 | Quan |
| 7,050,698 | B1 | 5/2006 | Quan |
| 7,057,666 | B2 | 6/2006 | Folio |
| 7,071,995 | B1 | 7/2006 | Horlander |
| 7,085,380 | B2 | 8/2006 | Quan |
| 7,116,375 | B2 | 10/2006 | Horlander |
| 7,236,683 | B2 | 6/2007 | Quan |
| 7,352,863 | B2 | 4/2008 | Quan |
| 7,395,545 | B2 | 7/2008 | Wonfor et al. |
| 7,492,896 | B2 | 2/2009 | Quan |
| 7,586,541 | B2 | 9/2009 | Chupp et al. |
| 7,620,178 | B2 | 11/2009 | Wonfor et al. |
| 7,706,533 | B2 | 4/2010 | Quan |
| 7,865,057 | B2 * | 1/2011 | Hollar .......................... 386/252 |
| 8,306,403 | B2 | 11/2012 | Quan et al. |
| 2002/0018564 | A1 | 2/2002 | Wonfor et al. |
| 2003/0049016 | A1 | 3/2003 | Wrobleski et al. |
| 2003/0091335 | A1 | 5/2003 | Quan |
| 2003/0149980 | A1 | 8/2003 | Hassell et al. |
| 2004/0047469 | A1 | 3/2004 | Ryan et al. |
| 2004/0111740 | A1 | 6/2004 | Seok et al. |
| 2004/0228605 | A1 | 11/2004 | Quan et al. |
| 2005/0111661 | A1 | 5/2005 | Wijnen et al. |
| 2005/0141876 | A1 | 6/2005 | Quan |
| 2006/0083373 | A1 | 4/2006 | Ryan et al. |
| 2006/0085863 | A1 | 4/2006 | Ryan et al. |
| 2006/0093139 | A1 | 5/2006 | Quan |
| 2006/0093140 | A1 | 5/2006 | Quan |
| 2006/0093326 | A1 | 5/2006 | Tan et al. |
| 2006/0251252 | A1 | 11/2006 | Quan |
| 2007/0030968 | A1 | 2/2007 | Tan et al. |
| 2008/0025696 | A1 | 1/2008 | Wonfor et al. |
| 2008/0151114 | A1 | 6/2008 | Kotos |
| 2008/0309816 | A1 | 12/2008 | Quan et al. |
| 2009/0202215 | A1 | 8/2009 | Tan |
| 2009/0296807 | A1 | 12/2009 | Cloutman |
| 2010/0021133 | A1 | 1/2010 | Wonfor et al. |

FOREIGN PATENT DOCUMENTS

| | | | |
|---|---|---|---|
| GB | 2 390 247 | B | 4/2006 |
| JP | 10-056611 | | 2/1998 |
| JP | 10-097465 | | 4/1998 |
| JP | 2002-010206 | | 1/2002 |
| JP | 2002-084494 | | 3/2002 |
| WO | WO 96/36174 | | 1/1996 |
| WO | WO 99/65240 | | 12/1999 |
| WO | WO 03/065716 | A2 | 8/2003 |
| WO | WO 2004/004346 | A1 | 1/2004 |
| WO | WO 2004/110060 | A1 | 12/2004 |
| WO | WO 2005/039176 | A1 | 4/2005 |
| WO | WO 2006/050009 | A1 | 5/2006 |
| WO | WO 2006/121628 | A2 | 11/2006 |
| WO | WO 2007/000585 | A2 | 1/2007 |

* cited by examiner

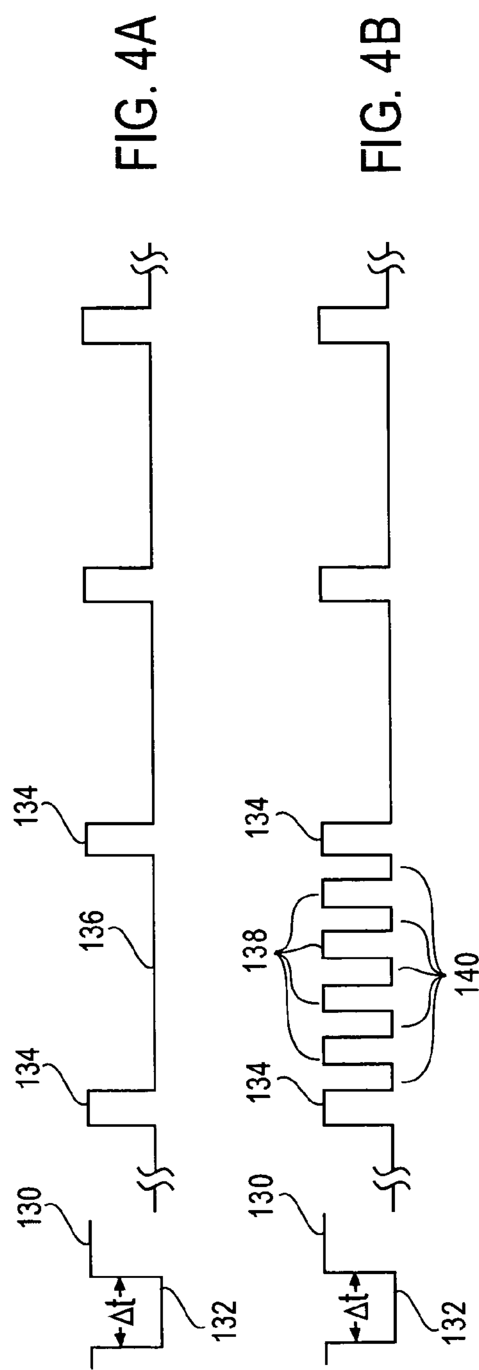
FIG. 4A
130
132
Δt
134
136
134
FIG. 4B
130
132
Δt
134
138
140
134
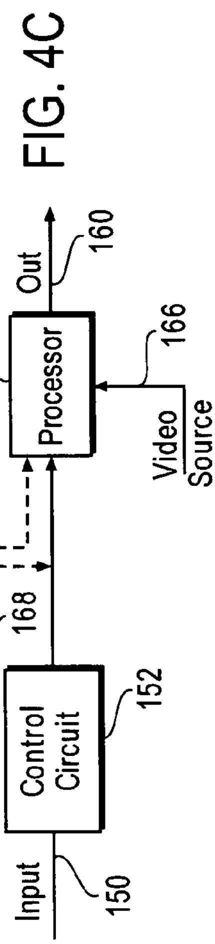
FIG. 4C
Wave Form Gen
156
Modifier Circuit
158
162
To Video Portion
164
168
Control Circuit
152
Input
150
Processor
154
Out
160
166
Video Source

METHOD AND APPARATUS FOR PROVIDING CONTENT CONTROL VIA DETECTION OF MODIFICATIONS TO A SIGNAL

CROSS REFERENCE TO RELATED APPLICATIONS

This application is related to Provisional application Ser. No. 60/927,223 filed on May 2, 2007 to Ronald Quan entitled, Content Control via Detection of Modifications to a Signal.

BACKGROUND OF THE INVENTION

The present invention pertains to content control systems and more particularly to a method and apparatus for detecting modifications purposely made to prior art signals such as for example, copy information signals or copy protection signals such as sync signal or color burst modifications, or pseudo sync or automatic gain control (AGC) signals in any combination, to form a subsequent content control command for controlling a compliant device. Ergo, a modification to a conventional signal, arrangement of signals or the number of signals detected determines the operation of the compliant device.

For example, if a pseudo sync or AGC signal is detected, the resulting content control command provides a predetermined control to a compliant device. If one signal is detected, the compliant device may record or display for an hour. If two signals are detected the compliant device may shut down or display an error signal in response to the content control command.

Such compliant device includes a reader, sensor or detector of one or more copy information signals such as a CGMS or data signal, and or to a copy protection signal such as an AGC and or pseudo sync signal.

SUMMARY OF THE INVENTION

A content control system may include one or any combination of storage, receiving, analog, digital, software, transmission, display, computational, radio frequency, magnetic, and or optical (compliant) device.

The following patents and or patent applications are incorporated by reference in this application, as well as any or all of their/its continuation (s) and or divisional(s). Any modification of at least a portion of a video signal as described in any combination of patent(s) and or patent application(s) mentioned and or incorporated by reference, may be detected for use in a content control system in accordance with the invention:

U.S. Pat. No. 5,583,936 exemplifies signal modifications which may be detected for use in content control. For example FIG. 4 exemplifies a modified front porch level; FIGS. 5a-5c exemplify adding or inserting a signal whose range may be anywhere within below blanking level to at least peak white in selected TV lines of selected pixels, which may also include blanking and or active picture portion(s); FIGS. 6a-6c exemplify apparatuses to insert or to provide pulses with one level and/or with another level (e.g., as a function of time) in selected pixels of selected TV lines; FIGS. 8, 9, 14a, 14b, 21 exemplify apparatuses which combine various pulses of particular duration(s) and or level(s) to a portion of a video signal, and or the level may be at or below blanking, near blanking, and or above blanking as for example illustrated by a voltage divider form with a +V and −V voltage source in FIGS. 6B and 9, sync replacement S50, 29b (e.g. prolonged sync pulse); and FIGS. 32a, 35b, 38e, 43g, which show for example adding a signal in the range of 100 KHz to 5 MHz to a portion of a video signal such as an active portion of a video line, or a portion of a sync pulse or horizontal blanking interval. Alternatively, one or more pulse may be added in a back porch area or portion of the video signal, wherein the pulses may be modulated, and a periodic or aperiodic signal may be added to a portion of a video signal.

The following is a partial list of modifications to the video signal of Patent '936 that may be used in one or more embodiments of the invention: 1) Enhancement or modification signals such as checkers, or a replaced level in a portion of the front and or back porch area, wherein the replaced level may be above or below a blanking level. 2) An amplitude, pulse-width, and or position modulated negative pulse in a back porch area (or its vicinity) or in a front porch area (or its vicinity). 3) A modulated waveform in the last few lines of a TV field or frame and or in a VBI portion, wherein the waveform has two different levels such as blanking level to below or above blanking level or to about blanking level. The period of the modulated waveform in the last few lines may be in seconds to less than a second. 4) For processing video in selected lines, narrowed syncs or narrowed syncs with AGC pulses or narrowed syncs with AGC and or pseudo syncs pulses (e.g., see blocks 208 and or 204, 206). An end of field (EOF) waveform or a waveform in a portion of a video signal (interval), (which) may contain a pulse amplitude modulated waveform whose frequency is between 100 KHz and 5 MHz. The amplitude modulation may (be static or) change/vary the amplitude of the waveform (e.g., 100 KHz to 5 MHz) over time (sync narrowing, and an enhancement signal may be included). Any combination of the enhancement or erroneous signals mentioned and or combined with AGC pulses and or raised back porch pulses and or pseudo sync pulses. 5) A video signal with AGC pulses with one set of narrowed horizontal sync pulses and/or another set of further narrowed horizontal sync pulses. 6) One or more levels of sync narrowing. 7) Level shifting in an HBI area or level shifting in one or more portions of the video signal or HBI. 8) Any modification or waveform (or a part of a signal) mentioned may be sensed, read or detected and used in a content control system.

U.S. Pat. No. 5,315,448. The following is a partial list of modifications to a video signal that may be used in one or more embodiments of the invention: 9) FIGS. 1 and 2, which for example show an analog copy protection signal for record or content control, or a digital copy protection information bit for content control. 10) An anticopy bit or content control bit detector and or an analog copy protection signal detector, which detects information in the digital and or analog domain to provide content control. 11) An A/D convertor to receive an analog signal and produce a digital flag for detection of a modification to the analog video signal and or 12) a D/A convertor to receive a digital flag (e.g., with a flag detector), which may be used to process the video signal into a modified analog signal. 13) A copy protection signal generator, which may apply copy protection signal(s) to a D/A convertor. 14) An SCPS (Serial Copy Protection Scheme) bit detector, which detects a digital bit stream for copy protection information. 15) A recorder, which may be just one exemplary device that senses copy protection information in the analog and or digital domain, and wherein the recorder may follow commands from the copy protection information to shut down, not record and or to add/insert a copy protection waveform (or to provide a modified signal) at its output. 16) A disabler of viewing or recording, which is a function of the detected copy protected information signal (or detected modified signal) in the analog and or digital domain. 17)

Detection of a flag in analog and or digital domain to control application of copy protection signal(s) and or to affect recording or viewing in compliant devices. Using any combination of an SCPS, anticopy/antiview, and or copy protection signal. For example, a reader may sense a pseudo sync pulse, back porch AGC pulse, pseudo sync-AGC pulse pair, field/frame length variation, line duration variation and or sync amplitude reduction. A content control system may sense any combination of these signals to perform a disabling/modifying function (e.g., disable recording and or viewing) and or to add/insert via a generator a waveform to provide an analog signal (and or digital signal) with copy protection. The waveform(s) may be programmable or set (e.g., by a user).

U.S. Pat. No. 6,381,747. The following is a partial list of modifications to a video signal that may be used in one or more embodiments of the invention: 18) FIGS. 1-3, show for example, a method and system of providing copy protection of video for analog and or digital signals, wherein the signals are transmitted via a network (e.g., digital delivery network). This digital delivery network may comprise a pay per view, or pay per download feature. 19) The transmission may include a wireless, wired, optical, phone line, cable, WiFi, Wimax, and or Internet. 20) A set top box or device (such as a receiver, cell phone, or portable computing device) receives program material with control bits. The control bits may command the device or set top box to generate any copy protection information signal, modified signal, and or any copy protection signal at its output (digital and or analog or radio frequency). The device or set top box may include any combination of a digital decompressor and or MPEG decoder, demodulator, software application(s), memory, storage device(s), computing system, CPU, electronic program guide, display, audio processing, conditional access system, configuration bits for turning on/off and or selected a signal with a copy protection signal or a modification in a video signal. The device may produce high, standard, and or low resolution video signal(s). Configuration and or mode bit(s) may be used in providing any modification of the (video) signal.

U.S. Pat. No. 6,501,842. The following is a partial list of modifications to a video signal that may be used in one or more embodiments of the invention: 21) claims 1-10, which alters the level after a sync pulse. For example, the alteration may include modifying a portion of a back porch such as in the range of −10 IRE to −30 IRE that may be sensed or measured and/or used to convey a command for a content control system. 22) Any combination of back porch lowering, sync narrowing, sync widening, AGC pulses, pseudo sync pulses, end of line signal, and or end of field signal may convey a signal or command for a content control system.

U.S. Pat. No. 6,516,132. The following is a partial list of modifications to a video signal that may be used in one or more embodiments of the invention: 23) FIGS. 3A to 7 and columns 9-14, which show examples of providing subcarrier signals in one or more horizontal blanking intervals. One example is to provide a modified color burst after the trailing edge of a horizontal sync pulse (or in a sync area). Note that the horizontal sync pulse may be set to a position and or pulse-width. The color burst may include amplitude (and or phase) variations within a portion of the video signal. For example a segmented color burst signal may be provided. Alternatively, the color burst modifications may include extra or fewer cycles of subcarrier than the color burst of another TV line or a “standard” color burst. Columns 9-14 show various tables 1a, 1B, 2a, and 2b, which are examples of various modifications or provisions to a video signal, and of which any feature of any combination may be used in a content control system. Of course these tables are examples, and other parameters or numbers may be used. One or more of the modifications may be utilized in a digital recorder(s), recorder(s), and or integrated circuit(s). 24) Colorburst modifications or changes in R-Y or B-Y signals (for a component TV signal) may be sensed/read/detected to convey a command to a content control system. The color burst modifications include phase, amplitude, one or more phase switch point, and or programmability of the color burst modification. 25) Any combination of a varied width or position in one or more sync signals may be used/read to convey a signal to a content control system. 26) The varied width and or position of a sync signal, AGC, pseudo sync, and or color burst modification may convey at least one command or signal to a content control system. 27) Two line (or m-line) or four line (or n-line) color stripe signal is described and may convey one or more content control command(s). 28) Advanced color burst signal or a color burst of extended duration, may be used in a content control system. Note a narrowed duration color burst signal is applicable for one or more embodiments of the invention. A weakened version of this color burst modification may be used for content control and or detection. This weakened version of color burst or split burst signal has improved playability (and for example may have reduced or negligible or nil effectiveness on a VCR). For example, a color burst may be divided into N zones. A modified phase or frequency can occupy a fraction of the color burst envelopes (e.g., 1 or 2 or 3, 4, or more cycles), which would provide an improved playability color stripe signal. The other (e.g. majority) zones may have substantially normal burst phase or frequency. In the PAL standard for example, playability artifacts can occur when too many cycles per lines have modified phase in the color stripe signal. One can reduce the number of cycles and or reduce the number of lines containing the modified phase. Also the modified phase is often a multiple of 90 degrees. Improved playability can be achieved by setting the modified phase to less than 90 degrees (e.g., between 1-30 degrees may be acceptable for playability, but other ranges in degrees are usable.) Also, in the PAL or NTSC standard some TV sets show a saturation or brightness shift (artifacts) on those TV lines modified with a few cycles of modified phase, and no artifacts on the lines with normal burst phase. Thus, there is a discontinuity on saturation or brightness throughout the TV field. One way to improve playability or to reduce artifacts, is to set substantially many, most, or all lines in the active field with a very mild or weakened form of the color stripe signal (e.g., one or two or three or four cycles per line). This way the shift or artifact is throughout the field, which displays a constant shift in saturation or brightness, and which is not as noticeable (because discontinuities of saturation or brightness are not displayed). The modified phase cycles may be placed in any order or location in the selected HBI (preferably an order or location that is detectable but does not cause display artifacts). A provided weakened form of a color stripe signal (or color burst modification) may be then detected for a control content system.

U.S. Pat. No. 6,600,873. The following is a partial list of modifications to a video signal that may be used in one or more embodiments of the invention: 29) FIGS. 1C, 2, and 3, which show detection of a color burst modification for content control. For example, a modified color burst detector may detect a phase variation or a particular phase as a way to signal the presence of a content control signal. 30) A disabler to modify/prohibit recording or viewing may be coupled to the detector. 31) A switch may be used to switch in a signal source upon detection of a modified color burst, wherein the signal source can be a variation of the program video source or a fixed, or pre-stored signal or substitute signal. 32) The modified color burst may contain one or more phase switch points and or a non normal subcarrier phase of one or more cycles, which may be used to signify one or more content control command. A modified color burst may be read, sensed or detected and used to convey information (e.g., control of viewing and or recording) in a content control system.

U.S. Pat. No. 6,836,549. FIGS. 2-11, show various modifications to sync or pseudo sync signals such as pulse width or position modification(s). Positive (or negative) going pulses (e.g., AGC pulses or (pseudo sync or horizontal sync pulses)) may include a pulse width or position modification. A duration of a gap between negative going and or positive going pulses may be read or sensed for use in a content control system (e.g., wherein the gap duration may include zero or some non zero value). Amplitude modifications of positive and or negative going pulses (or gap) may convey a content control signal. For example, a change in position, amplitude, pulse-width, phase, gap-width, and or level from one sync, pseudo sync, back porch pulse (AGC or positive going), and or AGC pulse may be sensed/read/detected/interpreted to convey one or more command for a content control system. The number of negative and or positive going pulses from one TV line to another TV line may be used to convey content control information or command. Further, the modification(s) of the positive and or negative going pulses within a TV line or within a duration (such as within one or more TV lines or one or more TV fields or frames) may be used in one or more embodiments of the invention. It should be noted that although the gap level is normally around a black level or a blanking level, it can be increased in level for increased effectiveness for copy protection purposes, increased effectiveness in an AGC system, or for use in providing a content control signal. For example the gap voltage or level between a trailing edge of a negative going pulse (e.g., pseudo sync pulse) and a leading edge of a positive going pulse (e.g., AGC pulse) may be raised above 0% white level (e.g., from 0.5% to 140% white level). Note a portion of the gap may be varied in level to provide increased (or decreased, e.g., lowering a gap level) effectiveness. Alternatively, a portion or whole of the gap voltage may be lowered to below a black or blanking level as part of a content control and or copy protection signal.

U.S. Pat. No. 7,039,294. FIGS. 2A-9 show various illustrations of modifying color burst signals or providing modified subcarrier signals following a sync pulse, which may provide a content control command. For example these modified signals may include one or more segments including one phase or another. The modified signals may include an amplitude variation in a portion of the horizontal blanking interval or in a portion of a back porch area. Providing a color burst envelope of phase, duration, position, and or amplitude variation can be utilized as content control in one or more embodiments of the invention. The color burst envelope may be read for any variation and used in a content control system. A color stripe detector (or its output signal) may or may not be used in processing a video signal whereby the color stripe detector or phase or frequency detector may be part of a content control system.

U.S. Pat. No. 7,050,698. FIGS. 2A-9 show various content control modifications in a horizontal blanking interval and or its vicinity. For example, modified frequency or phase of a subcarrier signal is provided in a portion of the horizontal blanking interval (HBI), which may be used to convey a content control information signal. Front porch modification and or adding a subcarrier signal to a sync tip portion and or to a back porch portion can be provided in a video signal, which can be sensed, read or detected by a detector "examining" one or more area(s) in the (horizontal) blanking interval. Any of these modifications or added/inserted subcarrier signal(s) may be used to convey information for a content control system. In addition, a subcarrier signal may include one or more cycles of a frequency that is not the nominal color subcarrier frequency. For example, the subcarrier frequency mentioned may be not equal (e.g., above or below a "standard" 3.58 MHz or 4.43 MHz color frequency) to the nominal or generally standard subcarrier frequency of the TV standard in question such as NTSC, PAL or SECAM subcarrier frequencies. A subcarrier signal of correct frequency and or phase and a signal of incorrect frequency and or phase may be provided in a back porch area or portion of a horizontal blanking interval, which may be used in one or more embodiment of the invention. The U.S. Pat. No. 7,050,698 invention includes the use of sync position, pulse-width modification, and or a basic copy protection signal such as pseudo sync and or AGC signals. Also included is Internet reception of video signals and the provision of one or more types of analog video signal(s) with one or more modification(s) to the analog signal(s). The invention further includes for example, a modified duration and or position of sync pulses (e.g., narrowed, or widened horizontal sync pulse(s) and or one or more horizontal sync pulse(s) changed in position). Also included is a modified duration of one or more horizontal blanking interval. For example, a widened portion on either or both sides of the active video line may be replaced with a voltage level or blanking level, or a narrowed horizontal blanking interval is provided, wherein extra picture information is included, which increases the duration of an active TV line. Incorporated in this application for example, is the description in column 10, lines 50-62 of Patent '698.

U.S. Pat. No. 7,236,683. FIGS. 1-5 show various modifications to a video signal which may provide content control, including: extended color burst duration, a sync signal inserted or added before or after a sync pulse, an extended (at least a portion of) pseudo sync and or horizontal sync, color burst attenuation or blanking, pre-sync pulses and or positive going pulses, or negative going and positive going signals in an HBI. A basic copy protection process such as AGC or pseudo sync pulses, or pseudo sync and AGC pulses may be used in combination with the above modifications to provide one or more embodiments of the invention.

U.S. Pat. No. 4,631,603. FIGS. 1-3 depict pseudo sync and or AGC pulses, which may be utilized in one or more embodiments of the invention. A weakened version of this signal (e.g., fewer lines in a field, or modified pulses in, for example, amplitude, pulse-width, and or position) to produce less effectiveness (and or better playability) may be used for detection for compliant devices or content control.

U.S. Pat. No. 4,907,093. FIGS. 1-6. Pseudo sync and or AGC pulse detection is used for content control. For example, a record control system is shown for shutting off or modifying a video signal if a pseudo sync and or AGC pulse is detected.

U.S. Pat. No. 4,577,216. FIGS. 1-2. A burst phase modifier provides a color-stripe signal on selected TV lines or a modified color burst in selected lines, which may include a modified phase of subcarrier, and may be used to convey a content control command. A weakened version of this signal (e.g., fewer lines or cycles of modified subcarrier in a field to produce less effectiveness and or produce improved playability) may be used for detection for compliant devices or content control.

U.S. Pat. No. 6,188,832. FIGS. 3-4. Sync pulse narrowing and an AGC pulse are shown which may be used for conveying content control. For example, a video signal including selected narrowed sync pulses (e.g., horizontal syncs) and pseudo sync and or AGC pulses, may be coupled to a compliant device, which detects the presence of one or more AGC, pseudo sync, and or narrowed sync pulses. Included may be a lowered back porch area, which may be combined with the video signal (as previously mentioned), and or the lowered back porch area, may be sensed for use in content control system(s).

U.S. Pat. No. 4,819,098. FIGS. 1-3. A video signal with a raised back porch or added/inserted positive going pulse may be combined with a reduced sync level on a sync pulse to provide content control. In general, the term "raised back porch" may include a signal with a raised back porch and or a positive going pulse in an HBI portion (e.g., after the trailing edge of a sync pulse, wherein the sync pulse may have normal or non-normal pulse-width.) A reduced sync level may be sensed or read for conveying information in a content control system. The combination of a reduced sync level and AGC back porch pulse, or AGC pulse elsewhere, may be sensed or read for conveying information to a content control system.

U.S. Patent Application Publication Number US20060093140A1. HD content control. Included is the modification of a signal with a tri-level sync signal. The modification may include positive or negative going signals in a back porch area, a portion of a horizontal blanking interval, a portion of an active line, and or a portion of a vertical blanking interval. Any composite or component video signal channel may have one or more of these modifications to provide content control. Any modification may include modulation.

U.S. Patent Application Publication Number US20060093139A1. Modification of a tri-level sync video signal may provide a content control command.

U.S. Patent Application Publication Number US20060251252A1. Modification of a video signal may be used to change a command in a content control system. This may include changing the position of added pulses of one type of copy protection signal relative to another. For example, one or more positive going AGC pulses may be added in other locations of a video signal to provide content control.

U.S. Patent Application Publication Number US20060085863A1, FIGS. 1-8, include an anti-copy protection (ACP) waveform (that is for example programmable) in the recorded media to provide content control.

U.S. Patent Application Publication Number US20060083373A1, FIGS. 1A-2D illustrate blanking a portion of the copy protection signal to provide content control.

U.S. Pat. No. 5,130,810. FIGS. 1-4 illustrate raising a black level of an active video portion, or lowering a back porch and or color burst envelope to provide content control.

U.S. Pat. No. 4,695,901. FIGS. 1-2 illustrate replacing a color-burst level and or clipping a portion of a pseudo sync pulse to provide content control. A copy protection signal may include at least a portion of a color burst envelope that is raised or lowered for a finite duration. For example, a copy protection such as AGC and or pseudo sync signals with reduced or defeated effectiveness may be used as a content control signal or be detected in a content control system.

U.S. Pat. No. 4,626,890. FIG. 1 illustrates removing burst phase modulation of a color burst to provide content control.

U.S. Pat. No. 5,157,510, FIGS. 1-4(i) illustrate narrowing or increasing the frequency of AGC, sync, and or pseudo sync signals. Time compression of a portion of a video signal is one method of processing a video signal to provide content control. Another application of time compression is scaling the video line and or field rate. For example, scaling may include compression or expansion geometrically along one or more dimensions (e.g., width and or height). Any of these signal modifications may be used to provide content control or be used as part of a video signal for content control.

U.S. Pat. No. 5,194,965. FIGS. 1-7(h) illustrate level shifting sync, AGC and or pseudo sync pulses, and narrowing of sync and or pseudo sync and or AGC pulses to provide content control. Also, increasing frequency of AGC and or pseudo sync pulses, and time compression of a portion of a video signal, which for example, could apply to scaling, may be used to provide content control or be used as part of a video signal for content control.

U.S. Pat. No. 4,937,679. FIGS. 1-6 illustrate a record control system which detects AGC and or pseudo sync to cause a shut down. The shut down may be adapted as content control for other devices such as display, transmission, or (other) storage devices.

U.S. Pat. No. 4,914,694, FIGS. 1-2B illustrate changing the number of lines in a TV field or frame to provide content control. This principle of changing the number of TV lines may be adapted to scaling from one TV standard to another TV standard. Sensing a change in TV format(s) can convey a content control command.

U.S. Patent Application Publication Number US2004/0228605A1. FIGS. 1-6C illustrate modifying black or gray frames, which may be used to convey information to a content control system.

U.S. Pat. No. 6,404,889, FIGS. 1-4 illustrate signal modifications such as VGA or component video copy protection and or sync pulses modified in position, amplitude, and or width, where one or more sync pulse may be deleted to provide content control.

Any signal or any modification of at least a portion of a video signal as described by any combination of the patent(s) and or patent application(s) mentioned above, and incorporated by reference herein, may be read, sensed or detected for use in a content control system in accordance with the invention. Any signal or combination(s) thereof may be provided to a content control device.

Watermarking or finger printing at least a portion of a video signal also may be used for one or more signals in the detection process of a content control system and or in combination with any signals described above or in any of the incorporated patents. The watermarked signals may be embedded in a non active video portion of the video signal, in an overscan area, or in a portion of the viewable area.

The present invention includes many embodiments that sense control bit(s) and or modification(s) to one or more of a large plurality of audio, data or video signals. Such modifications may include one or more copy protection signals, and or copy protection enhancement signals. Upon sensing any combination of the signals, a content control system is provided with a content control command for control of a compliant device. By way of example, the content control system may include a player, receiver, telephone (which may include a wired or wireless telephone), set top box, computer, recorder, and or digital/analog device. A receiving device may include a wireless device.

Content control may incorporate record, play, transmission, and or display condition(s)/control. For example, a content control command generated by detection of a modified signal can determine whether or not (or how) a program is recorded, played, transmitted, and or displayed. An example of such a condition may include when and or how long the program is recorded, played, transmitted, and or displayed. Another example of such a condition may include how a program is recorded, played, transmitted and or displayed.

For example, the bit rate, resolution, and or distribution (such as in a limiting way) may be included as part of a content control system.

By way of example, various embodiments of the invention may include the sensing, reading or detecting of one or more of the following (enhancement) signals which exemplify the modified signal(s) (such as described previously with respect to the above patents and applications), and which are sensed, read or detected, in accordance with the invention.

1) A lowered back porch (portion or whole).
2) A lowered front porch (portion or whole).
3) A lowered active video line (portion or whole).
4) A modified, narrowed, or widened sync pulse.
5) Position, pulse-width, or edge modulated sync pulses (e.g., two or more pulses).
6) A sync pulse whose edge is changed in position referenced to another sync pulse.
7) A sync pulse whose duration is changed referenced to another sync pulse.
8) A sync pulse whose duration is narrowed and/or includes one or more positive going pulse (e.g., for causing an attenuation effect on an automatic gain control (AGC) amplifier).
9) One or more amplitude modulated negative and or positive going pulse. For example, negative going pulses may include signal(s) going below a black (e.g., below +7.5% white or 0% white) or blanking level (e.g., below 0% white); and or positive going pulses may be a signal above a blanking or black level. Other examples, may include pseudo sync, AGC, or level shifting pulse(s) in a blanking interval (e.g., level shifted portion of a back porch and or a portion of a sync pulse).
10) A narrowed or widened burst envelope.
11) A blanked burst envelope (portion or whole).
12) A modified phase, frequency and or amplitude burst envelope (portion or whole). This modified burst envelope may include one or more incorrect frequency added to a portion of the video signal (e.g., after a sync pulse(s). For example, the incorrect color frequency signal may or may not cause a copy protection effect on a VCR (e.g., VHS), and can be detected for use in a content control system or compliant device. For example, an incorrect color frequency signal (or a signal of correct frequency but a different amplitude and or phase) may be added to a portion of a back porch area. The modified signal is sensed by a VCR, which causes a neglible or non copy protection effect, but when detected by a compliant device invokes content control, or copy control by for instance, inhibiting recording, reducing resolution of the recorded and or playbacked video, setting a time limit on the stored copy, or the like. This signal for example, may be provided in an overscan portion or in part of an active TV area. A modified color burst signal may be located in selected TV lines such as one or more lines in an overscan area, or a modified color burst may have weakened or defeated effectiveness, but still usable for detection in a content control system. For example, a system can provide a color stripe signal with sufficiently modified phase or frequency (in a sufficient number of TV lines) for detection in a content control system with a reduced or negligible or no effectiveness on a video recorder's color system (e.g., a VHS recorder). One example (of a weaken or reduced effectiveness signal) is to provide for 1 or 2 lines per N TV lines with a split burst color stripe signal (or modified phase or frequency) or with a subcarrier signal of incorrect frequency.
13) A modified amplitude, width, and or position of a sync pulse (e.g., horizontal, vertical, equalizing, and or pseudo sync pulse/signal).
14) A pseudo sync pulse.
15) An AGC pulse in a horizontal blanking interval and or vertical blanking interval.
16) A positive pulse and or negative pulse in an active television (TV) line.
17) A TV signal with a tri-level sync pulse.
18) A modified R-Y or B-Y, Y or U or V or I or Q signal, and or modified R, G, and or B signal.
19) A modified or unmodified pseudo sync and or AGC pulse in a horizontal or vertical blanking interval.
20) A narrowed sync pulse followed by one or more AGC pulse.
21) A narrowed sync pulse followed by a copy protection signal that causes an attenuation effect on an AGC system or video cassette recorder (VCR).
22) A change in a TV line (or horizontal or vertical blanking interval) duration (e.g., in an active line duration and or in a blanking interval duration, or letter boxing) or a change in the number of TV lines in a TV field or frame (e.g., scaling to a different TV standard). A use for letterboxing may be used for encoding/inserting/adding information, data or signals, in a portion of the non-program video area (e.g., portion of the margin area in the left, right, top, and or bottom of a colored in, grayed or black area) to provide content control.
23) A change in TV field or frame period or frequency (e.g., from higher to lower resolution or lower to higher resolution).
24) A change in TV standard (NTSC to PAL or vice versa, or a composite video format to component, or interlaced to progressive or vice versa, which may include different line or field duration/frequency.
25) An extended amplitude (e.g., negative going) pulse, such as a pulse whose level is lower than a sync tip level. An extended amplitude pulse may include a negative going pulse in a blanking interval whose tip is lower than a "normal" sync tip level.
26) An AGC pulse or positive going pulse/signal in a blanking interval whose positive peak amplitude is less than 120% peak white. A "smaller" AGC pulse or positive going signal or waveform or pulse of less than 50% peak white may be included for use in content control.

Any of the above signals and or other examples of modifications may be used to control content such as limiting recording, viewing, and or passing a signal from one (compliant) device to another (compliant) device (wherein the devices may be similar or different). For example, one or more of the above signals numbered 1-26, may be provided in a video signal. The video signal for example, may include one or more signals in which a compliant device's sensing system or reader may sense one or more of the above signals. The compliant device may not have to sense all signal(s) or modifications. For example, a compliant device or a sensing system or reader may read, sense or detect pseudo sync pulses and or AGC pulses even though there are also narrowed syncs (e.g., horizontal or vertical) in selected lines. So in this illustration, a modified or unmodified copy protection signal including a number of pseudo sync pulses, and or AGC pulses and narrowed sync pulses, may provide a command to a compliant device that reads or senses pseudo sync pulses and does not necessarily read or sense the narrowed sync(s). Examples of (compliant) devices may include recorder(s), computer(s), cell phone(s), set top box(es), receiver(s), tuner(s), transmitter(s), display(s), player(s), television(s), storage device(s), and or telephone(s).

Also, any compliant device may operate at different (TV) rates (e.g., resolution) and may affect bandwidth (or resolution or (displayed) framing) of the audio and or video signal as part of a content control system.

The invention may be imbedded inside an integrated circuit (IC) or device with capability of activation or deactivation by any means such as electrically erasing lines, electronically connecting lines, and or programming method(s). It follows that the invention includes the processing of an integrated circuit, wherein circuitry for providing one or more modifications or waveforms to a video signal exists, whether or not one or more circuits or systems that provide the modification(s) or waveform(s) is used. A non-use version may include the electrical disabling of the intended function, for example, by program control, setting one or more/power/control/signal line(s) for non-operation, and or by enabling or disabling fusable link(s).

A modification to one or more portions of the video signal may be used in part or whole in a content control system. For example, a change in pedestal or black level in at least a portion of the video signal can denote a signal for content control. An illustration would have the set-up level of the video denote information related to a content control system. In one example, a change in pedestal (e.g., one or more level(s)), a signal added to a portion of a (normally "black or gray" or colorized) letter boxed area, or a displayed frame around a picture, may convey information which may be detected to provide a content control command for a content control system.

The inserted signal or signals, or signal modifications, may be affected in any combination of video channels available. For example, a luminance, a component, and or a chrominance channel may be used with at least one modification or signal insertion/addition/deletion to provide content control.

Another embodiment of the invention may then include the received content control signal which may be passed on with or without modifications (e.g., to a video signal).

Another embodiment of the present invention contemplates modifying video resolution, tonal range, color space, field or frame rate, line rate, pixels, and or temporal aspects as part of a content control system. For example, if the received video is to be displayed in a high quality mode, but the output signal is to be of limited quality distributed elsewhere. For example, the received signal may be compressed to a more lossy type of compression, which would show more video motional and or static artifacts.

Accordingly, it is an object of the present invention to sense, read, detect and or interpret modifications purposely made to known signals to provide a content control command or signal for use in controlling a device.

Another object of the present invention is to (expand the number of signals to) include a video copy protection enhancement signal or modified signal(s) as at least a part of a content control system or part of content control system signal.

It is another object of the invention to include another type of video copy protection signal(s); for example, dynamically modified video signals such as modulated sync or pseudo sync pulses or AGC (or positive going) pulse/signals, so as to provide a content control method and or apparatus. Static copy protection signal(s) may be used.

Yet another object is to include one or more variation(s) in a portion of the video signal as a way of conveying content control. For example, modifications in duration and or level in a portion or portions of the horizontal and or vertical blanking interval may be used for content control. Also any waveform added to a portion of the video signal may be included as part of a content control method.

BRIEF DESCRIPTION OF THE DRAWINGS

FIGS. 4A-4B are waveforms illustrating a "standard" video signal portion and a modified video portion, respectively, in accordance with the invention.

FIG. 4C is a block diagram illustrating an exemplary portion of a compliant device.

DETAILED DESCRIPTION OF THE INVENTION

Figure 1:
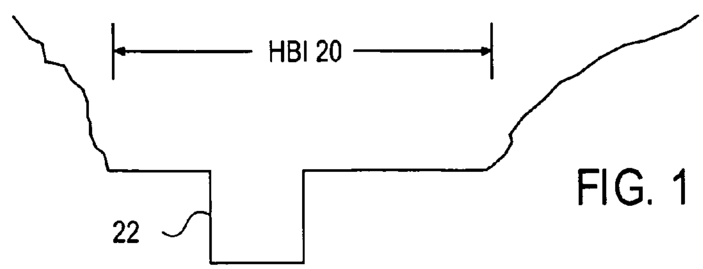
FIG. 1 illustrates a "standard" video signal.

Further examples of embodiments in accordance with the invention include one or more of the following:

A) A detection device or method that interprets, reads, senses or detects a level shifted portion in a blanking interval such as a horizontal blanking interval, a vertical blanking interval, and or an overscan portion of a video signal. This level shifted portion may include a negative and or a positive going pulse/signal/waveform that for example is added or inserted in at least a portion of a back porch, sync pulse, color burst area, and or front porch.

B) A detection device may also read, sense, detect or interpret a variation on certain sync pulses. For example, if one or more sync pulses are missing or altered from a known standard signal, then a content control command/signal may be generated. For example, if a sync pulse or sync signal is altered in position, duration, and or amplitude, any alteration of the sync pulse or sync signal that is read or sensed may be used for content control. Similarly, if a positive going pulse such as an AGC pulse is altered in position, duration, and or amplitude, any alteration of the positive going or AGC pulse that is read or sensed may be used for content control. Other examples may include reading or sensing pseudo sync pulses in a horizontal blanking interval (and or in a vertical blanking interval), pseudo sync or horizontal sync pulses of different duration/amplitude from one line to another, or from one set of lines to another set of lines. A widened or narrowed sync may be sensed to provide a content control command. A serrated sync pulse, which may include two or more sync tips, may be sensed. Two or more negative or positive going pulses with different peak amplitudes may be sensed. For example, two or more sync tips of not necessarily the same duration and or sync tip amplitude or level in a blanking interval, or in an over-scan region, may be sensed. A waveform comprised of two or more sync tips, wherein the sync tips may be detected by a sync separator (such as described in U.S. Pat. No. 5,194,965), and wherein for example a positive going pulse/signal of a given duration is at a level between below a blanking level and above a blanking level may be detected.

C) A detection device may also sense, read, detect or interpret one or more "enhancement" signals such as those described in the U.S. Pat. No. 5,583,936 and its continuations and or divisional patents. For example, the sensing of one or more signal levels toward the end of a TV line (e.g., added or inserted checker pulses or other signals) may be read and or interpreted as a signal for content control. In another example, a blanked/replaced area of a portion of a video signal may be sensed, read, or interpreted to provide a signal for use in a content control system. For example a line with a blanked or replaced signal such as a blanked or replaced color burst signal or sync signal may be read or sensed as a content control signal. Thus the lack of a signal(s) may be used to convey content control command(s).

D) A detection device may also sense, read, detect or interpret one or more "enhancement" signals such as those described in U.S. Patent Publication Number US2003/0091335 and its continuations and or divisional patents. For example, an amplitude extended portion or portions of a sync, pseudo sync, or generated/provided negative going pulse in a portion of the video signal may be sensed in terms of a level below a known sync tip level and then used in a content control system. An abnormal amplitude sync/pseudo sync pulse, which can have a lower or higher amplitude or signal level than, e.g., a standard sync amplitude and or standard sync tip level, may be utilized to convey information for a content control system. Similarly an abnormal amplitude/level/duration of a color burst (or AGC pulse) may be read and or interpreted for use in conveying a command or signal to a content control system (e.g., to a compliant device).

E) A detection device may also sense, read, detect or interpret one or more signals such as those described in U.S. Pat. No. 6,836,549. Here any combination of a modulation (or varied) effect on AGC pulses, back porch pulses, positive going pulses in horizontal and or vertical blanking interval(s), negative going pulses such as horizontal sync, equalizing pulse, vertical sync pulse, and/or pseudo sync pulse, in any combination of one or more may be used to convey a command(s) for a content control system. The modulation effect may include position, duration, pulse-width, gap-width, frequency, time compression and or expansion, and or amplitude modulation. The modulation (or varied) effect can occur within a TV line period, from one line to another, one field to another, one interval to another, and or within a particular time interval.

F) Any of the signals previously mentioned in paragraphs A-E may be combined with other signals such as one or more control signal(s)/bit(s), pseudo sync pulses, AGC pulses, color burst modifications in phase, frequency and or amplitude, and or AGC pulses in horizontal blanking intervals, for use as content control commands for input into a content control system. Thus extra or deleted (partial or whole) sync pulses may be used to convey information for a content control system.

G) Waveforms or signals such as data signals, time code, CGMS, teletext, closed caption, VITC, VITS, VIRS, positive going, and or negative going signals/waveforms may be used in any combination (e.g., including with any combination of previously mentioned paragraphs A-F for use in a content control system.

H) The invention also includes such circuits, apparatuses, or methods, which provide, synthesize, process, modify, and or generate at least one readable or interpretive signal.

I) The invention includes a reader or interpretation apparatus or method. The reader or interpretation apparatus (e.g., sensing or detecting circuit or system) may be implemented as a programmable reader which, for example, is able to be programmed into reading one or more signals or modifications of the video signal. For example, the reading device may be programmed to sense certain types of sync pulses (e.g., pseudo sync or modified syncs) or to sense certain types of signals following a horizontal sync pulse (of a set pulse width, including normal, widened, or narrowed duration) such as a waveform of a particular frequency (e.g., subcarrier frequency or non-subcarrier frequency), or certain levels in a portion of the video signal. The reader etc., thus may be programmed by hardware and or software, and may be updated to read new types of variations of the content control signals. For example, the updating may be provided via a digital link, a programming file (e.g., stored or transmitted), and or setting hardware circuits. So one embodiment of the invention is a reader, or a programmable reader (e.g., for sensing, reading or detecting a modified video signal).

J) The invention includes a compliant device. For example, the compliant device may include a recorder, display, receiver, distribution system, and or a display. A compliant device includes a reader, sensor, detector to read, sense or detect modification(s) to a video signal and to output one or more signal(s). The actual reader, etc., may be hard wired and or programmable, may be embedded in a circuit and or may be disabled or enabled via programming and or links (e.g., that are burned or blown). Further, the reader etc., may be for example an invention as described embedded inside an integrated circuit: As noted "The invention may be imbedded inside an integrated circuit (IC) or device with capability of activation or deactivation by any means such as electrically erasing lines, electronically connecting lines, and or programming method(s). So the invention includes the processing of an integrated circuit, wherein circuitry for providing one or more modifications or waveforms to a video signal is fabricated, whether or not one or more circuits or systems that provide the modification(s) or waveform(s) is used. A non-use version may include electrically disabling the function (e.g., by program control, setting one or more/power/control/signal line(s) for non-operation, and or by enabling or disabling fusable link(s).)".

K) The present invention includes a compliant device with a (signal) modifier and or signal generator. The signal modifier may change the quality of the video and or audio signal or transmitted signal. For example, the signal modifier may reduce or increase the number of TV lines, or reduce bandwidth or resolution or area shown (e.g., partial or portion of picture). Audio quality may be affected (for example upon sensing one or more modifications of a video signal or sensing a content control signal). The signal modifier for example, reads a content control signal and outputs a signal, which provides the signal modifier of the examples previously mentioned. Another example of the signal modifier is the modulation of the video or the changing of the incoming video signal with a content control signal(s). For example, the modifier may remove/attenuate/strengthen/alter one or more content control signal, and or add or insert a signal(s). A signal generator may add or insert a copy protection signal, copy protection enhancement signal, or a copy protection information signal by default or by sensing the presence of a modified video signal. For example, a modified video signal may include one or more waveform(s), signal(s), of level(s) provided in a portion of a video signal (such as any of those previously mentioned).

L) The invention may include an embodiment, which has the encoding of a signal for content control in black frames of a video signal. Such black frames for example exist in scenes that are faded or cut to black, or that are in black or gray portions in letterbox. For example, various gray levels and or color signal (or watermark signal) may be added or embedded in one or more portions of the black frames or letter box area or overscan area to convey one or more content control signal(s) or command(s).

Any combination of the concepts of previously mentioned paragraphs A-L may be configurable or programmable and/or may constitute an embodiment of the invention.

The present invention may include the following devices (or compliant device(s)) or any combination thereof; a display, a transceiver, a transmitter, an audio device, a computer, a recorder, a player, a DVD player and or DVD recorder, magnetic medium recorder, magnetic medium recorder, optical medium player, optical medium recorder, set top box, telephone, cell phone, solid state memory player and or solid state memory recorder, wireless device (e.g., wireless device including a receiver, recorder, display, and or player), internet access, satellite access, cable access, broadcast access, network access, WIFI access, WIMAX access, optical access, wireless access, and or wired access (which may include any of the signal modifications of previous mention).

In terms of video standards, the invention includes the use of scaling or transcoding of video signals. The invention also includes progressive scan, interlaced, component, color difference, luminance. RGB, composite (e.g., PAL and or NTSC), reduced resolution (or standard resolution), and or increased resolution standards (which for example may include any of the signal modifications of previous mention).

The invention may include any compression processing (e.g., DCT, wavelets, PCM, and or any MPEG standard).

The invention may include reading one or more copy protection signal, one or more modified and or added signal and or include generating, providing, or processing the video signal to provide an old or new modification to the video signal. The new modification may include a different copy protection information signal and or a new copy protection signal and or scrambling/encryption/watermarking. For example, an incoming video signal may include pseudo sync and or AGC pulses, and after reading the pseudo sync pulses, a new video signal comprised of selected narrowed, e.g., horizontal and or vertical sync pulses, with an AGC pulse following one or more of the selected narrowed sync pulses, is provided (e.g., at an output). Similarly (or vice versa) a video signal with narrowed horizontal sync pulses followed by one or more AGC pulse(s) and pseudo sync pulses, which may have associated AGC pulses to form one or more pulse pairs, may be the content control signal that is read by a compliant device. The compliant device upon reading the pseudo sync pulse, may provide a signal without sync narrowing and may provide one or more pseudo sync AGC pulse(s), (one or more modified color burst signals, e.g., of modified amplitude, phase, and or frequency) and or AGC pulses in a portion of a horizontal blanking interval in selected TV lines. Note that the location(s) of one or more positive going pulses in one or more selected horizontal blanking interval on the read video signal may be different for compliant device's provide signal. For example, a signal coupled to a compliant device's input may have AGC pulses in horizontal blanking interval (HBI) and in the vertical blanking interval, but the compliant device may output a different set or differently located AGC pulses of the HBI (or vice versa). A general example here would have a device read a copy protection signal "A" and output a copy protection signal "B" or vice versa (wherein content control and/or copy protection signal A=B or A not equal to B, part or whole of A and or B).

The invention may include a subscriber network and or video or content, for example, based on a fee received, wherein a user communicates with a content provider for payment.

The invention may include software, digital, and or analog implementation. For example, a programming apparatus may be included in the modification of the video signal and or the sensing or reading of the modified signal (e.g., a content control signal, copy protection signal, copy protection enhancement signal, or a level shifted portion of the video signal.).

The invention may include audio signals, data signals, video signals, and or radio frequency signals. An embodiment may include removing and or attenuating one or more portion(s) of a video signal.

Referring now to the figures, FIG. 1 illustrates a "standard" or "normal" video signal including a horizontal blanking interval (HBI) 20 and a "standard" or "normal" sync signal denoted by numeral 22.

Figure 2A:
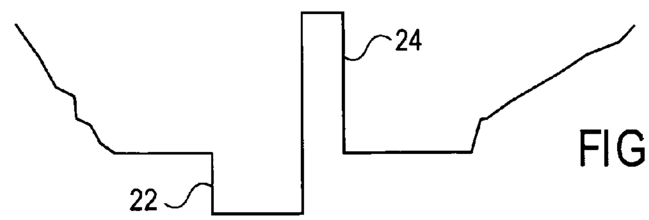
FIGS. 2A-2E are waveforms illustrating various modifications of the video signal of FIG. 1.

FIG. 2A illustrates a modification of the video signal by an automatic gain control (AGC) signal 24 following the sync signal 22. AGC signal 24 is currently used in some content control systems.

Figure 2B:
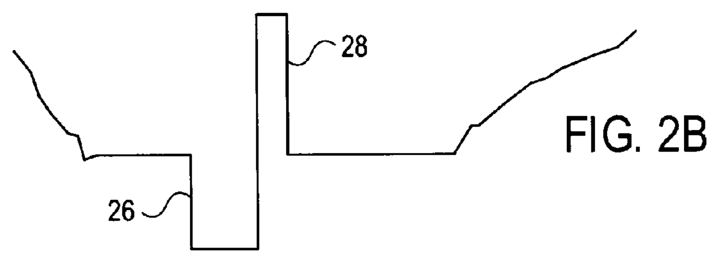

FIG. 2B illustrates a modification of the video signal with a narrowed sync pulse 26. The narrowed sync pulse 26 may be sensed for content control purposes. Also shown in the figure is an optional automatic gain control signal, AGC 28, which can be sensed for content control purposes. Alternatively, a video signal may include a narrowed sync pulse 26 and or the AGC signal 28 that may be combined with one or more pseudo sync and or AGC pulse. For example, a compliant device may sense the one or more pseudo sync and or AGC signal. In the case of one or more content control command, the signals 26 and or 28 may be ignored. Note that sync pulse 26 and or AGC signal 28 may be provided in the HBI (20, FIG. 1) and either or both may be utilized for content control purposes. Further, HBI 20 may vary in duration (e.g., wider or narrower or normal duration).

Figure 2C:
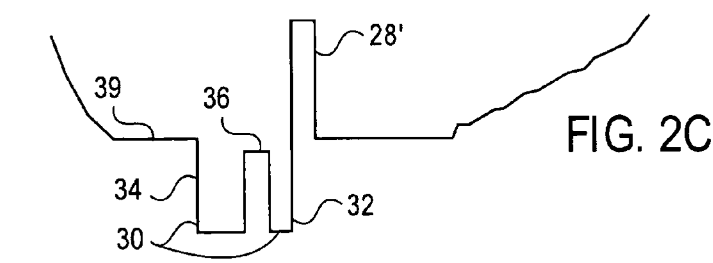

FIG. 2C illustrates a modification of the video signal of FIG. 1, wherein a multiple sync tip signal 30 is provided in an HBI (20, FIG. 1). Sync tips or pulses 32, 34 need not (necessarily) be matched in sync tip level or amplitude, but can be matched or approximately matched. In one example, the sync tips are provided to a level that is sensed by a sync separator circuit. Sync tips or pulses 32 and 34 may form a "serrated" pulse with a positive going pulse such as at 36. Pulse 36 may be above the sync separator detection threshold and or at a level below or above a blanking level 39. A positive going signal or pulse, 28', may be provided after (signal) 32.

Figure 2D:
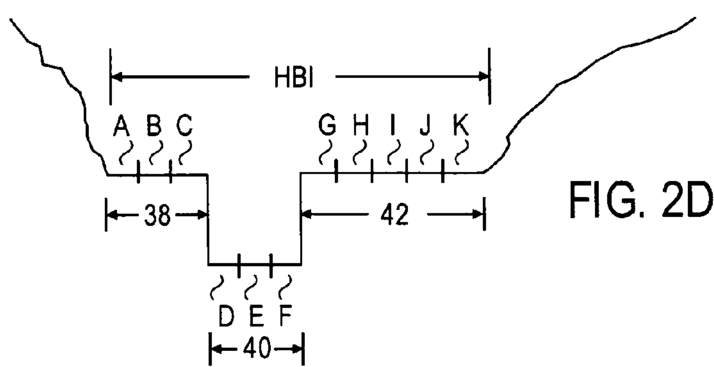

FIG. 2D illustrates an HBI separated into intervals A-K. Any signal or level shifting of either positive or negative direction may be implemented in one or more intervals. Also, more or less intervals may be used to define an area or areas in the HBI and or its vicinity. Thus, modifications in level may be done in a front porch area 38, a sync area 40, and or a back porch area 42 (e.g., in any interval(s) A-K or A0 to An (0 to n intervals), for example. Alternatively, the modifications may be done in other area(s) such as in an active portion of a video line. Further, a modification may be done in an overscan area, a vertical blanking area, or a vicinity of vertical and or horizontal blanking interval. Thus the illustrated intervals A-K may be expanded, contracted, and or repositioned/relocated.

Figure 2E:
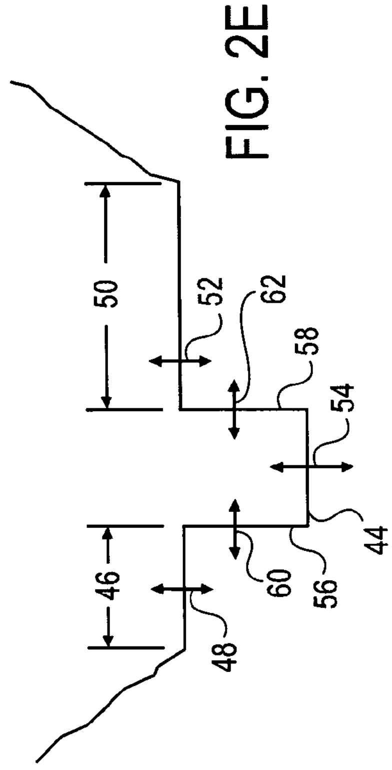

FIG. 2E illustrates another example of modifications to a video signal wherein at least a portion of a sync pulse 44 may exhibit pulse width, pulse position and or amplitude modification (e.g., modulation). FIG. 2E may include a level shift to a portion of a front porch region 46 (arrow 48), and or a level shift in a portion of a back porch region 50 (arrow 52). FIG. 2E may include a level shift of a portion of the sync signal or sync pulse 44 (arrow 54). The level shift may be negative or positive. Although the sync pulse shown in FIG. 2E or 2D) is an example of a horizontal sync pulse, similar modification(s) (such as level shifting) may be made to vertical and or equalizing pulse(s), in associated blanking interval(s) or vicinity.

Note that the shifting may include modulation. An example of modulation is a time varying effect of the shifting of levels. The illustrated intervals (or signal within) of 44, 46, and or 50 may be expanded, contracted, and or repositioned or relocated.

FIG. 2E also may illustrate that from one TV line to another TV line, a position of a leading edge 56 and or trailing edge 58 of sync pulses may change (arrow 60 and 62, respectively). FIG. 2E further illustrates that from one TV line to another TV line, the duration or pulse width of sync signals or sync pulses may change. FIG. 2E also illustrates that from one TV line to another TV line, the sync tip level of sync pulses may change (arrow 54). FIG. 2E illustrates for sync signals or sync pulses from one TV line to another, changes in pulse width, pulse position, edge position, sync tip level, and or amplitude may occur. Any of these modifications or changes may be sensed, read, detected, and or interpreted for use in a content control system.

A portion of a sync pulse may include a waveform added to a portion of the sync tip. This waveform may include a periodic, non-periodic, and or modulated waveform.

By way of example, U.S. Pat. No. 5,583,936 FIG. 32a illustrates a waveform of about 0.1 to 5 MHz (or other frequency (range) for a waveform) added to a portion of a video signal. This waveform may be broadly added to any portion of a video signal, such as a portion (or whole) sync tip (vertical sync pulse tip and or horizontal sync pulse tip), blanking interval, and or to a selected video line. Sensing at least a part of this waveform example can be utilized in a content control system. Alternatively, this type of a waveform that has a frequency between 100 KHz and 5 MHz may be inserted into a portion of the video signal such as a portion of the vertical sync signal or overscan area and combined with AGC pulses and or pseudo sync pulses. A compliant device or reader may sense (or ignore) any combination of the waveform, AGC pulses, and or pseudo sync pulses. For example, a compliant device or reader may ignore the waveform (such as a waveform with a frequency in a range of about 100 KHz to 5 MHz) and sense pseudo sync and or AGC pulses (or vice versa).

In another example, FIG. 43g of U.S. Pat. No. 5,583,936 illustrates another example that can be adapted to both active video lines and sync pulses. In this example, one or more positive cycle pulse is added/inserted to a sync tip area and or to a portion of a video signal. Alternatively, a waveform comprised of positive and negative cycles may be inserted or added to a selected sync (tip) such as selected vertical sync pulse(s) and or selected horizontal or equalizing pulse(s). The waveform or its effect (on a system) may be sensed, read, or interpreted for use in at least part of a content control system.

Narrowed and or widened sync pulses such as a narrowed and or widened vertical sync pulse, or a horizontal or equalizing pulse, may be read or interpreted for use in a content control system. Likewise, removing a serration in the vertical sync signal can be read or interpreted for use in a content control system.

Figure 3:
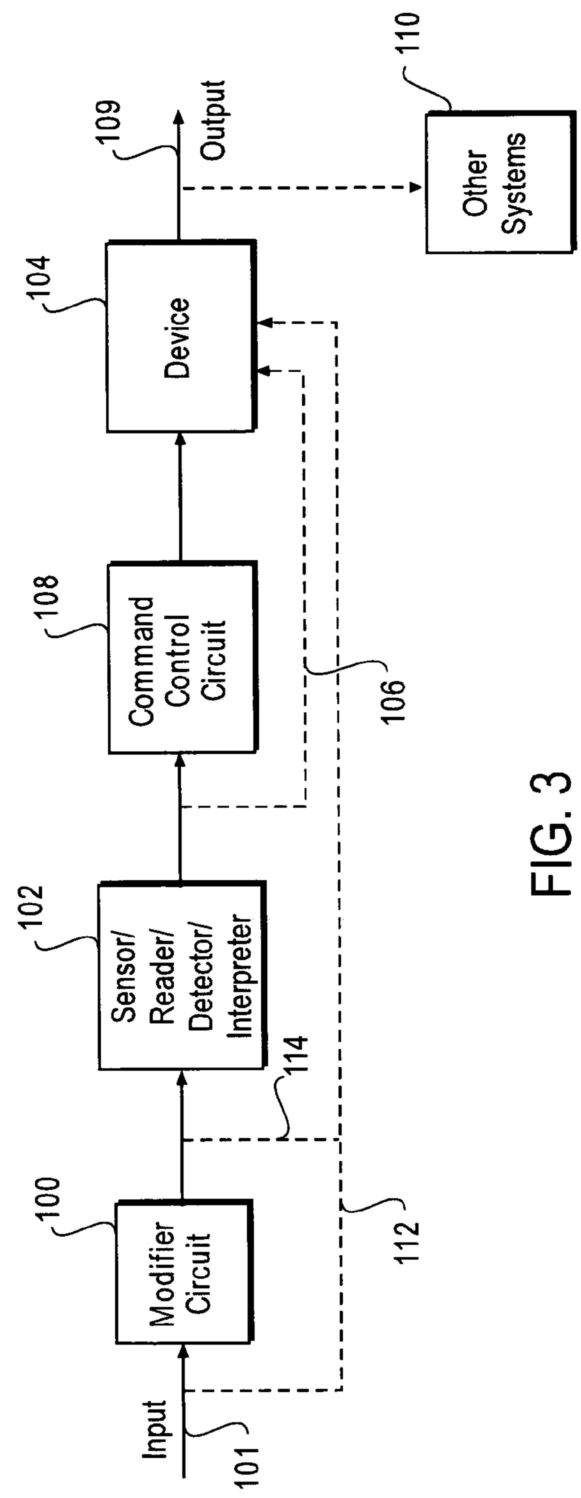
FIG. 3 is a block diagram illustrating general and exemplary apparatus for achieving the functions and signals contemplated by the present invention. Any of the blocks within FIG. 3 may be a separate embodiment of the invention.

FIG. 3 illustrates an example of a modifier circuit 100, which receives a selected input signal, such as a video, audio, data, RF, etc., signal at input 101, and generates or provides modifications to a video signal, which modifications are sensed, read, detected or interpreted as content control commands. For example modifier circuit 100 may provide or generate selected waveforms and or replacement of a portion of a video signal. Circuit 100 (or input signal 101) may include any or all of the signals and or modifications of previous (or after) mention. Circuit or system 100 may be a separate stand-alone processor (for example, providing modified video signals). Reader 102 (via a lead 114) and or device 104 (via a lead 112) may be coupled to an input signal source 101 as depicted in dashed line. For example, signal 101 may be a digital and or video signal source that may include any or all of the signals and or modifications of previous (or after) mention and or a weakened copy protection signal.

Also shown in FIG. 3 is a sensor, reader, detector, or interpreter circuit 102, which senses, reads, detects or interprets one or more modifications of a signal (digital and or analog) supplied by an input signal (101), the modifier circuit 100, or by a digital and or video signal. Sensor/reader/detector/interpreter circuit 102 may generate or provide a signal (which may or may not be encrypted/scrambled) based on reading or sensing one or more modification to a signal. The output of circuit 102 may be coupled to a device 104 as shown by dashed line 106, or may be coupled to device 104 via a command control circuit 108. The device 104 may then respond to the output of circuit 102 or circuit 108 so as to perform any number of condition(s) functions, etc. One example of a condition or function is to not display, to not record or to not receive a signal. Another example condition is to have device 104 provide at one of its outputs 109 a copy protection signal, a copy protection information signal, an authorized/de-authorized receiving signal, an authorized/de-authorized viewing/transmission signal, and or a modified signal. One of these outputs from device 104 may be coupled to a network or to a system 110. System 110 may be a compliant device, which may include a reader, sensor, detector, or interpreter. The input signal 101 and or the modifier circuit 100 output may be supplied to the device 104 and or 102, as depicted by dashed lines 112, 114, respectively, and provide modified signal(s) for detection or reading or content control.

Thus FIG. 3 illustrates various combinations of circuits that may be considered embodiments of the invention.

FIG. 4A illustrates a "standard" video signal portion with horizontal sync 132 with a duration of Δt, and a black or blanking level 130. Also shown is a vertical sync signal comprised of a positive going pulse 134 and a negative going pulse 136. The negative going pulse 136 has typically a sync tip level of the standard sync tip level of sync 132 (e.g., −40 IRE or −300 mv).

FIG. 4B illustrates a modification to a signal wherein a waveform is comprised of positive pulses 138 and negative pulses 140 inserted or added to at least a portion of the tip area of negative going pulse 136 of FIG. 4A. Note that the amplitude of the waveform may have the negative going pulse 140 below or above the sync tip level of horizontal sync 132 (e.g., a normal or standard sync tip level). Further, the positive going pulse 138 may be above or below the blanking or black level 130. The waveform may have a frequency between 100 KHz to 5 MHz (or some other range of frequency such as DC to 30 MHz, with or without symmetrical duty cycle). The waveform may be inserted in another portion of the video signal such as in a blanking interval, an overscan area, or in at least a portion of an active line or field. The waveform may be modified or modulated. For example, the level of the positive and or negative going pulses or portions may be increased or decreased. Or for example, the level of signals 140 or 138 may change in level (up and or down). The waveform may include a pulse amplitude modulation (e.g., pivoted at negative peak or positive peak or somewhere between positive and negative peak values), amplitude modulation, frequency modulation, no modulation, DC offset (e.g., over a line period or interval), varying DC offset (e.g., over a time period or interval), and or position modulation. The waveform may be added, inserted or provided to an active portion of the TV line in selected lines of a TV frame or field, or in an overscan area.

FIG. 4B may be interpreted as adding pseudo sync pulses in at least a portion of the vertical sync signal or vertical sync pulse(s).)

FIG. 4C illustrates an exemplary portion of one of the devices (104, 110) mentioned in FIG. 3. Modification to a signal such as a video signal is provided by inputting data via an input 150, to a control circuit or N-zero register as represented by block 152. The output of circuit 152 is coupled to a processor 154, which provides an output at 160. A waveform generator or provider 156 is coupled to a modifier circuit 158 which provides an output at 162. Note that the modifier circuit 158 may be selected to modify or to not modify the waveform received from generator/provider 156. As stated previously, the modifier circuit 158 may include some form of modulation of the signal (note that a zero modulation can be included). The output 162 may be supplied to the processor 154 as shown by dashed line 164. The output signal of processor 154 on output 160 may provide for blanking a portion of the video signal, adding/inserting negative going signal(s), adding/inserting positive going signal(s), modulating signal(s), deleting at least a portion of one or more signal(s), modifying color subcarrier signal(s), modifying color or component signal(s), adding or inserting copy protection signal(s), adding or inserting copy protection or content control signal(s), adding or inserting "enhancement" (e.g., copy protection) signal(s), and or modifying at least a portion of a video signal (e.g., scaling, pedestal, frame rate, number of TV lines in a field or frame, compressing, decompressing, or the like).

In yet another set of embodiments, a new waveform, in which a gap voltage that is normally set to a blanking level, may be set to higher level for greater effectiveness in copy protection. This variation in at least a portion of the gap duration (between a pseudo sync and AGC pulse) also enhances a basic copy protection signal. The effectiveness of the pseudo sync AGC process can be controlled or varied by changing the level of at least a portion of the gap. One reason is that sampling circuits in video equipment or VCR or AGC systems sometimes have a delay (e.g., a propagation gate/switching delay) or have a longer than expected sampling pulse after sensing a sync or pseudo sync pulse. If an AGC pulse following a sync or pseudo sync pulse is narrower than the sampling pulse, the sampling pulse will sense the AGC pulse as part of the gap area. Since the gap area is typically set to a black level, the effectiveness of the AGC pulse will be attenuated somewhat should the sampling pulse extend into the gap area. Thus raising or lowering the gap or portion of the gap can increase or decrease the copy protection effect or effectiveness of a VCR or recorder or AGC system. Note that at least a portion of the gap may be modulated to cause a dynamic effect. Also, the AGC pulse(s), for example, prior to a gap, may be modulated (e.g., in a similar or dissimilar manner).

Figure 5:
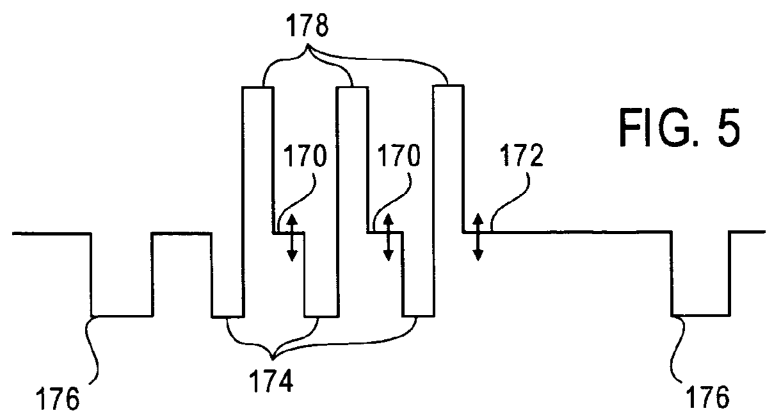
FIG. 5 is a waveform illustrating a further embodiment of the present invention.

FIG. 5 shows an example of varying the level of at least of portion of one or more gap intervals, 170 or 172. Pseudo sync pulses 174 are shown, and a sync signal such as horizontal sync is identified as 176 (a varied or set amplitude, position, and or pulse width sync pulse may be used (e.g., FIGS. 2B-2E)). Gap duration of the gap intervals 170, 172 is illustrated as a period after a positive going signal 178. Any portion of intervals 170, 172 may be varied in level (e.g., static or dynamic). For example, for increased effectiveness, a first fraction of the duration of interval 170 may be increased to a value below, equal, or greater than the peak value of the positive going signal 178. Note that this first fraction may be positioned within the gap interval. An increased (or lowered) portion of the gap may be varied in amplitude, width, and or position (e.g., to vary copy protection effect(s) or effectiveness). The gap interval 170, 172 may be divided into "n" segments. One or more segments may carry a selected voltage level.

In a broad view of one set of embodiments of the invention, enhancement modifications (that are defined here) such as level shifting, sync modifications, modulation of sync or AGC pulses, incorrect frequency in an HBI, and or HBI/VBI modifications, may be used separately or in combination with a video signal for a purpose of sensing, reading or detecting a content control signal for use in a content control system.

In a further set of embodiments, any one or combination of the enhancement modifications may be combined with a copy protection signal that causes an AGC effect such as pseudo sync/AGC pulses, and or AGC pulses in one or more blanking intervals (e.g., one or more horizontal blanking intervals), or a copy protection signal that causes a chroma effect (e.g., a incorrect color signal in one or more horizontal blanking interval(s)). In this set of embodiments, the synthesized video signal includes one or more enhancement signal example and one or more of the copy protection signal(s), to provide the synthesized copy protection signal. A compliant device or content control system reads or interprets any combination of the copy protection signal(s) (and or one or more of the enhancement signal(s)). In this example, the reader, sensor or detector may ignore any of the enhancement signal(s), and read, sense or detect at least a portion of the copy protection signal (e.g., pseudo sync pulse(s) and or HBI AGC pulse(s)). Alternatively, the reader, sensor or detector may ignore one or more basic copy protection component (e.g., pseudo sync or AGC pulse) and read, sense or detect one or more enhancement signal (e.g., incorrect color frequency, one or more narrowed sync, a modified sync, a modified HBI or VBI duration, and or a waveform in the 32 KHz to 30 MHz (or 100 KHz to 5 MHz) range). The reader, sensor or detector system may read, sense or detect any combination of any component of a basic copy protection signal and or one or more enhancement signal.

Another set of embodiments includes the programmability of the reader, sensor or detector systems. To this end, new content control waveform(s) that may be provided to a video signal, can be read, sensed or detected by programming the reader, sensor or detector to accept or interpret any new content control waveform. The programming of the reader, sensor or detector may be done with an update file or command. The file may be downloaded or loaded via memory or by transmission. The different video signal additions or modifications of previous mention may represent a multitude of circuits. One embodiment of the invention provides a programmable detector, which can be configured to one or many types of detectors via control bits or programming bits, or a programming file. This programming capability adds flexibility for detecting a multitude of the modifications mentioned above for example, but also adds a feature of upgradeability to detect newly provided changes in a video signal. For example, any of the modifications above may change in parameter such as frequency, amplitude, position, location, level, width, or the like. A programmable detector can take into account parameter changes to existing or future content control signal(s), signal modifications, or embedded signals in a video stream or signal. Configuration bits may be provided by transmission, a storage device, or by a system operator or consumer. For example, if a new type of content control signal is to be added for detection, a user may have to input code or bit(s) to view or receive or record the video signal first. This code may then configure an ACP generator or video signal modifier, and or a programmable detector.

Figure 6A:
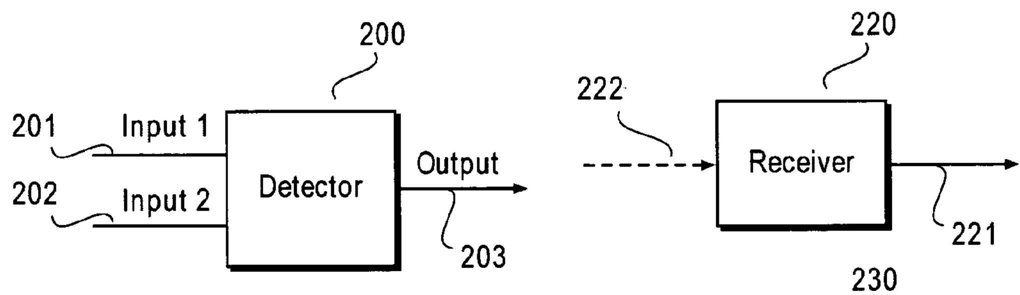
FIGS. 6A-6C illustrate a detection system or apparatus.

FIG. 6A illustrates an embodiment of the invention wherein a detector 200 is programmable to receive control bit(s) from a first input source 201 and a video signal (analog and or digital) from a second input 202. For example the first input 201 may receive configuration and or mode bits to program the detector for one or more modifications to an analog or digital video signal. Output 203 then produces an output signal that is indicative of one or more modifications to the video signal. Output 203 may be mapped to generate one or more types of signal from the combinations of modifications sensed or read.

Figure 6B:
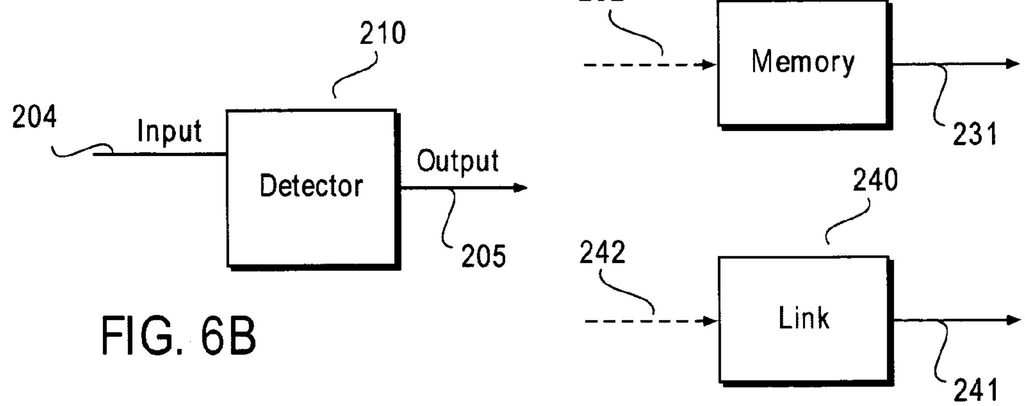

Similarly in FIG. 6B, control and or mode signals (e.g., bits) may be combined in a video stream (analog or digital) as at input 204, to configure detector 210 for sensing various modifications to the video signal, and providing an output 205. For example, modifications can be defined but not limited to added signals, at least a partial deletion of one or more portion of a video signal such as sync, burst, active video, and or including scaling of a TV standard, moving a portion of a video signal to another location, or any other example of previous mention.

Figure 6C:
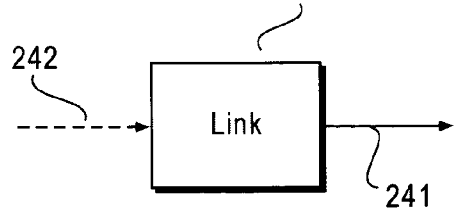

FIG. 6C illustrates one or more example for receiving or providing programming signal(s) to the programmable detector (e.g., detectors 200 and or 210). For example, a receiving device 220, (e.g., set top box, cell phone, wireless device, optical device, etc) may provide control and or mode bits of input 222 to program the detector (e.g., 200 or 210) via an output 221. In another example, a memory device 230, may be used to provide control and or mode bits via input 232 to program a detector via an output 231. The memory device for example, may receive data from another storage device, via transmission, or from a pre-programmed device. Note that memory device 230 can provide the programming (data) for the detector via storage onto a disc (e.g., DVD, CD, hard drive storage medium, optical, and or magnetic)), memory unit (e.g., hard drive, solid state memory, flash memory), or tape. In FIG. 6C, a link 240, which can originate from broadcast, satellite, cable, wireless, digital, and or Internet (input 242), may also provide configuration, control, and or mode bit(s) to program a detector via an output 241. It should be noted that configuration can be defined as mode and or control and vice versa.

The one or more examples in FIG. 6C may be coupled alone or in combination and or may be coupled to a detector 200, 210 of FIG. 6A and or FIG. 6B. Dashed lines 222 indicate that receiver 220 may receive the (mode and or configuration) signal via a wireless network, antenna, fiber, cable, or the like. Similarly dashed lines 232 to memory 230 illustrate that memory 230 may be written by an external source (e.g., for mode and or configuration), another memory device, a receiving device, or the like. The dashed line 242 of the link 240, can be mode and or configuration data from an optical, wired, Internet, wireless, analog, and or digital communication or data (transfer) system. Examples of the types of signals that would be coupled to a programmable detector (e.g., for reading, sensing or interpretation) include one or more (but not limited to) of the signals mentioned in paragraphs A-L, 1-26, and or one or more of the incorporated patents, publications or applications.

It should be noted that any weakened or modified copy protection signal may be used in combination with a (basic or other) copy protection signal (e.g., pseudo sync and AGC and or AGC pulses in selected horizontal blanking intervals). For example, a weakened color stripe signal may be combined with a basic copy protection signal that causes attenuation in a VCR. Alternatively, a content control signal can be comprised of any combination of weakened or non-weakened copy protection signals (e.g., color burst modifications, enhancement signals, AGC signals, pseudo sync signals, modified or narrowed sync signals, AGC pulses in blanking intervals, etc.). Any weakened version of any combination of FIGS. 2A, 2B, 2C, pseudo sync, horizontal sync, color burst modification, and or AGC signals (e.g., a weakened version may include reduced amplitude and or width of positive going pulses, or shifted or separated negative going and or positive going pulses, and or fewer positive and or negative going pulses), may be used as a content control system. By way of example, a weakened version may mean a signal that has reduced effectiveness on a VCR, but is detectable or has improved playability such as reduced darkening cause by AGC pulses (e.g., in FIGS. 2A-2C or in other patents mentioned) or reduced color artifacts (e.g., color burst modification) on a display or reduced scan errors (e.g., from negative going pulses). A weakened version of a signal may be combined with any non-weakened signal for content control and or for copy protection.

One example of a weakened color stripe signal is to place at least one cycle of modified phase after a sync signal, followed by a plurality of cycles of substantially normal phase for selected lines (e.g., 1 in N lines, 2 in M lines, or the like.) Other examples of the weakened color stripe signal (e.g., for detection or compliant device(s) or content control), places the one or more cycle of modified phase and "fill" as required in other areas after a horizontal sync pulse with cycles of substantially normal phase. Thus, the cycle(s) of modified phase can be placed or provided anywhere between a trailing edge of sync and a beginning of an active video line. Note that the horizontal blanking interval may change in duration or may be adjusted. An illustrated example can have modified phase subcarrier signal of less than 1.6 usecs (e.g., about 900 nsecs-1100 nsecs) followed by at least 2 usecs (e.g., 3.6 to 5.1 usecs) of unmodified phase subcarrier signal in selected horizontal blanking interval(s). Another illustrated example may have 1-4 (or more) cycles of modified phase subcarrier signal followed by 5-20 (or more) cycles of substantially normal phase subcarrier signal. Any of these examples or a weakened copy protection signal (such as color stripe, AGC, pseudo sync, etc.) represents an improved playability signal that may or may not be effective as copy protection. In one or more cases of the weakened copy protection signal the effectiveness is at least reduced. Another example may have fewer copy protection waveforms provided, such as fewer lines of color stripe, AGC pulses, and or pseudo sync pulses. Another embodiment may include providing any form of color burst modification within a vertical blanking interval and or its vicinity (e.g., overscanned active lines). Another embodiment, for example, to weaken a (color stripe) signal, may include controlling the amplitude of a portion of any of the color stripe signals. For (an improved playability, reduced effectiveness, and or a detection) example, in the portion where there is a modified phase, at least a part of that modified phase (or frequency) portion may be reduced in amplitude (or raised in amplitude).

Yet another embodiment of a weakened color stripe signal adds or inserts cycles of incorrect phase or frequency away from the trailing edge of a horizontal sync pulse or closer to the beginning of an active line. For example, at least 1 or 2 cycles is or are added in a later portion of a back porch interval. One or more TV or VCR set usually samples the beginning to mid portion of the back porch area for color demodulation or color subcarrier reference. By inserting or adding an incorrect signal away from the beginning and/or mid portion(s) of a back porch area, the incorrect signal is not sensed or not sensed substantially. By being not sensed or not sensed substantially for the incorrect signal (e.g., via the cycles placed in a later portion of a back porch interval), an improved playability for VCR or TV set is provided.

In yet another embodiment, a weakened color stripe signal (of modified phase and or frequency) may be provided with a lowered portion of the video signal such as one or more of the following: a lowered portion of a front porch, a lowered portion of a back porch, a lower portion of an active field. Yet another embodiment inserts or adds signals that cause an attenuation effect on an AGC system or VCR, such as AGC pulses in the HBI or VBI (e.g., back porch pulses and or AGC/pseudo sync pulses). This then causes under attenuated circumstances (e.g. from a VCR and or TV set), an early scan or early color burst sample such that a modified color burst that is inserted or added in a later portion of a back porch interval is not sensed or is less sensed, such as when compared to a normally sampled color burst. For example, the modified burst that is not sensed or less sensed provides improved playability, or reduces or "defeats" the color burst modification (copy protection) effectiveness. The earlier scan or earlier sample in a back porch is the result of an attenuation provided by one or more AGC signals (AGC pulses and or pseudo sync/AGC pulses), which causes a sync separator to sense one or more lowered portion of the video signal (e.g., a lowered active video portion and or a lowered portion of a front porch) that is prior to a horizontal sync pulse. This sensing of a lowered portion of the video signal prior to a horizontal sync pulse causes an earlier color burst sample to be provided in a VCR and or TV set which, for example, evades detection of an incorrect signal added to a later or mid portion of the back porch interval. For example, for purposes of detection, an improved playability, and or a weakened or a reduced copy protection effect, a modified color burst of incorrect phase and or frequency is illustrated in FIG. 5C in U.S. Pat. No. 6,516,132, wherein a later portion of the burst envelope has the modified color subcarrier phase and or frequency. Note that adding or inserting cycles of substantially normal phase with the modified burst envelope also helps in playability and or in reducing effectiveness on a VCR. So a weakened signal may include extra cycles of normal phase subcarrier. Note that a weakened color stripe signal may include a gap of attenuated cycles or no cycles in the color stripe waveform. For example a burst of M cycles (of a given phase, frequency, duration, and or position) may be followed by a gap of a particular duration (including a finite or zero duration), followed by N cycles (of a given phase, frequency, duration, and or position). N may or may not be equal to M. Also, note that a weakened color stripe signal (e.g., for detection) may have a shortened, normal, or widen duration of a color burst. In some instances a different frequency (e.g., non normal subcarrier signal for the particular TV standard), which has less effect on a display (and or video recorder) may be used that a signal of non normal phase (e.g., P cycle(s) of non normal frequency provided or generated in one or more blanking interval).

In another example of the modified color burst for detection purpose with a weakened or "defeated" copy protection effect, any variation of FIGS. 3B to 7 of U.S. Pat. No. 6,516,132 or FIGS. 2B to 2F of U.S. Pat. No. 7,039,294 may be used.

In other examples, depending on the VCR and or TV set, it may be preferable to place the cycles of incorrect phase or frequency in a middle and or beginning portion of the burst envelope or a portion of back porch (to improve playability and or to reduce or "defeat" effectiveness). For example, see U.S. Pat. No. 7,039,294 FIGS. 2B, 2D, and or 2F. It may also be preferable to add cycles of substantially normal phase in selected horizontal blanking interval(s) (including one or more horizontal blanking intervals that include one or more cycles of modified phase or frequency) to improve playability or reduce effectiveness on a VCR, while allowing detection.

In some examples, an incorrect frequency waveform may be added (in part or in whole) on top of a substantially normal color burst signal. This incorrect frequency waveform may preferably have little or no effect on a VCR, but may be detectable by a compliant device or a content control system.

Referring to FIG. 2D, one illustration of the adding or inserting a weakened color stripe signal of incorrect phase and or frequency places this (incorrect) signal in sectors J, and or K, and fill sectors G, H, and I with normal phase burst. Other combinations are possible. Optionally, sectors A, B, C, G, H, I, J, and or K may be lowered in level (e.g., between −5% to −15% white level or −5 IRE to −15 IRE). Again other numbers or sectors are usable. Note that a horizontal sync pulse denoted by sectors D, E, and F may change in position, pulse-width, and or amplitude. Also, the sectors noted in FIG. 2D correspond to A-K, but can be sectors 1-N (in some cases, N may represent some factor or multiple of a pixel duration). Examples of a lowered portion of a video signal may be derived from U.S. Pat. No. 7,050,698 FIG. 2A (e.g., MFP 18, modified front porch) from FIGS. 3A and or 3B (e.g., MFP 32, MFP 44), and or from U.S. Pat. No. 5,583,936 (and or its continuation or divisional patents). Patent '936 includes in its specification and or claims, a method and apparatus for adding a waveform in a portion of the video signal to cause an early retrace (e.g., the waveform may be a negative going waveform which is added or inserted to cause a lowering effect), or for lowering a portion of a back porch region. Note that the negative going waveform may be added in a portion of the active video line or field or overscan area. Any type of weakened copy protection signals (e.g., any version of a weakened color stripe signal or a weakened version of AGC and or pseudo sync signals) or signal modification may be provided via one or more mode, APS, ECM, EMM, configuration, control, and or test bit(s).

In terms of providing any of the modified waveform(s), copy protection signal(s), weakened copy protection signal(s), and or detectable signals, a system operator or other device such as a media player, (e.g., a digital video player for example, a DVD, a hard drive player, a solid state memory player, a cell phone, a wireless device, or the like) may enable bits to a device to (turn on or off) deliver or provide one or more of these types of signals, for example, to set top boxes or other devices.

In summary, various embodiments of the invention include:

1) Method of and apparatus for reading or sensing or detecting a video signal, wherein the video signal includes narrowed sync pulses in one or more horizontal blanking interval, and wherein one or more narrowed horizontal sync pulses is sensed, read or detected and a subsequent signal (e.g., a content control command) is provided to indicate the one or more narrowed horizontal sync pulses is present or has been read, sensed or detected.

2) Method of and apparatus for reading or sensing or detecting automatic gain control (AGC) pulses in a video signal, wherein the video signal has one set of AGC pulses that is narrower than another set of AGC pulses, and wherein an output is provided to indicate the presence of the narrowed AGC pulses.

3) Method of and apparatus for reading, sensing or detecting two or more negative going pulses in a horizontal blanking interval (HBI), wherein the two or more negative going pulses are sensed by a sync separator, and a signal is provided to indicate the presence of the two or more negative going pulses.

4) Method of and apparatus for reading, sensing or detecting multiple pulses during a vertical sync signal interval, wherein the multiple pulses are sensed, read or detected and a signal is provided indicating the presence of the multiple pulses within an interval in the vertical sync signal or in the vertical sync signal interval.

5) Method of and apparatus for reading, sensing or detecting a pseudo sync pulse in a vertical sync signal interval utilizing a sync separator, further comprising detecting multiple pulses within the vertical sync pulse interval and outputting a signal indicative of the presence of the pseudo sync pulse in a the vertical sync signal interval.

6) Method of and apparatus for reading, sensing or detecting a presence of modifications to a video signal, wherein the modifications are comprised of a narrowed sync pulse, lowered back porch area, lowered front porch area, color burst extension in duration, color burst narrowed in duration, narrowed positive going pulse after a narrowed sync pulse. Upon sensing the presence of the modifications, a signal (e.g., a content control command) is provided indicative of the presence of the modified video signal.

7) Method of and apparatus of the previous embodiments 1-6, wherein the method and apparatus is part of a content control system.

8) A programmable or configurable detector of modifications of a video signal, wherein the configurable detector receives one or more bits to program the configurable/programmable detector to output a signal indicating the presence of one or more modifications to the video signal.

9) The programmable or configurable detector of embodiment 8 wherein the one or more bits is received and or stored.

10) The programmable or configurable detector of embodiment 8 wherein a downloadable file, transmitted file, or stored file is provided to determine the sensing characteristics of the programmable or configurable detector.

11) The programmable or configurable detector of embodiment 8, wherein the one or more modifications of the video signal include any combination of: a pseudo sync pulse, a lowered or raised level of a portion of a back porch interval, a lowered or raised level of a portion of a sync pulse, a narrowed or widened sync pulse or color burst, an incorrect color subcarrier frequency and or phase signal in a portion a horizontal blanking interval, a raised or lowered level in a portion of a front porch or end of line, an AGC pulse in a horizontal blanking interval or vertical blanking interval, a sync amplitude variation, a sync level, an added waveform in a portion of a horizontal and or vertical sync signal, and or a level shift in a portion of an active TV line.

12) The programmable or configurable detector of embodiment 8 wherein information or data is transmitted or stored to provide configurable video modifier circuit to output a newly modified video signal, and wherein the programmable detector receives information to configure the programmable detector to recognize or sense the newly modified video signal.

13) An apparatus comprising a detector for sensing a first type of copy protection signal or content control signal coupled to its input, further comprising one or more circuits for inserting or adding a different type or second type of copy protection signal or content control signal its output.

14) The apparatus of embodiment 13 wherein a first type of copy protection signal is provided or designed by one company and a second type of copy protection signal is provided or designed by another company.

15) The apparatus of embodiment 13 wherein the copy protection signal processes are provided by one or more companies.

16) The apparatus of embodiment 13 wherein the first type of copy protection or content control signal includes narrowed sync pulses and wherein second type of copy protection or content control signal does not include narrowed sync pulses.

17) The apparatus of embodiment 13 wherein the first type of copy protection or content control signal does not include narrowed sync pulses and wherein second type of copy protection or content control signal include narrowed sync pulses.

18) The apparatus of embodiment 13 where two or more copy protection or content control signals are sensed and or provided.

19) An apparatus comprising providing a weakened, negligible, or nil copy protection effectiveness signal that is detectable by a content control system or compliant device.

20) The provided signal of embodiment 19 wherein playability is improved as compared to the effectiveness of a copy protection signal.

21) The provided signal of embodiment 19 wherein one or more cycles of incorrect phase or frequency is inserted or added in selected blanking intervals of selected TV lines.

22) The provided signal of embodiment 19 wherein the selected TV lines are chosen to minimize playability problems and or to reduce copy protection effectiveness on a VCR.

This disclosure is illustrative and not limiting. Further modifications will be apparent to one skilled in the art and are intended to fall within the scope of the appended claims.

What is claimed is:

1. A method of utilizing a modified color burst signal in a video signal for content control, comprising:

receiving via a circuit the video signal; combining via a circuit the modified color burst signal that includes a portion of a color burst envelope with a modified phase, frequency or amplitude, with the video signal to provide a content controlling video signal;

sensing by a video cassette recorder the content controlling video signal; wherein the content controlling video signal has weakened or no effectiveness on the video cassette recorder in terms of copy protection and therefore weakened or no effectiveness on the video signal recordable on the video cassette recorder; and coupling the content controlling video signal to a detector in a compliant device to provide a command to inhibit recording, playback, transmission and or display of the video signal.

2. The method of claim 1 wherein the modified color burst signal is a color stripe signal with selected modified phase, frequency or amplitude.

3. The method of claim 2 wherein the color stripe signal is inserted in a sufficient number of television lines whereby the color stripe signal is detectable in a content control system while having negligible or no effectiveness on a video cassette recorder's control or recordability.

4. The method of claim 1 wherein the content controlling video signal of weakened effectiveness is provided in 1 or 2 television line(s) per N lines with a split burst color stripe signal or with a subcarrier signal of incorrect frequency.

5. The method of claim 1 wherein the modified color burst signal is located in selected television lines in an overscan area so as to have weakened effectiveness while still providing detection in a content control system.

6. The method of claim 1 wherein the modified color burst signal has an incorrect frequency, phase or amplitude and is added or inserted to a portion of a back porch area; and when detected by the detector in the compliant device the modified color burst signal invokes content control by inhibiting recording, playback, transmission or display while having the weakened or no effectiveness on a video cassette recorder.

7. The method of claim 1 wherein compliant devices include one or more of the following; recorder(s), computer(s), cell phone(s), player(s), set top box(es), receiver(s), tuner(s), transmitter(s), display(s), television(s), storage device(s), telephone(s), wireless device(s), optical medium recorder(s), various electronic access(es).

8. The method of claim 1 wherein a modified color burst signal of weakened or no effectiveness is combined with a basic copy protection signal that causes attenuation in a video cassette recorder.

9. The method of claim 1 wherein at least one cycle of modified phase, frequency or amplitude is added or inserted after a sync signal, followed by a plurality of generally normal cycles, for selected television lines.

10. Apparatus for utilizing a modified color burst signal in a video signal for content control, comprising:

a circuit for combining the modified color burst signal that includes a portion of a color burst envelope with a modified phase, frequency or amplitude, with the video signal to provide a content controlling video signal;

sensing by a video cassette recorder the content controlling video signal; wherein the content controlling video signal has weakened or no effectiveness on the video cassette recorder in terms of copy protection and therefore weakened or no effectiveness on the video signal recordable on the video cassette recorder; and a detector in a compliant device for receiving the content controlling video signal to provide a command to inhibit recording, playback, transmission and or display of the video signal via the compliant device.

11. The apparatus of claim 10 further comprising:

a circuit for including narrowed sync pulses or two or more negative going pulses in a horizontal blanking interval in the video signal; and wherein the content controlling video signal of weakened or no effectiveness is further indicative of the presence of the narrowed sync pulses or of the two or more negative going pulses.

12. The apparatus of claim 10 further comprising:

a circuit for including automatic gain control (AGC) pulses in the video signal, wherein one set of AGC pulses is narrower than another set of AGC pulses; and wherein the content controlling video signal of weakened or no effectiveness is further indicative of the presence of the narrowed sync pulses.

13. The apparatus of claim 10 further comprising:

a circuit for including multiple pulses in the video signal during a vertical sync signal interval; and wherein the content controlling video signals of weakened or no effectiveness is further indicative of the presence of the multiple pulses.

14. A method of providing a control signal for a content control system, comprising:

providing to the content control system a weakened color stripe signal in a video signal, wherein the weakened color stripe signal includes a portion of a color burst envelope with a modified phase, frequency or amplitude;

detecting via a detector circuit in the content control system the weakened color stripe signal;

wherein the content control system prohibits recording, playback, transmission and or display of the video signal in response to detecting the weakened color stripe signal; and wherein the weakened color stripe signal has negligible copy protection effectiveness on a video cassette recorder.

15. A method of providing a content control indication in a video signal output by a video receiver apparatus, comprising:

receiving a video signal or video file from an external source at a port in the video receiver apparatus;

receiving a command at the video receiver apparatus;

modifying the received video signal or video file at the video receiver apparatus, in response to the received command, to include a weakened color stripe signal in selected scan lines of the video signal, the weakened color stripe signal having an incorrect color burst in a horizontal blanking interval of the selected scan lines, wherein the incorrect color burst is detectable but inadequate to prevent an acceptable video tape recording of the modified video signal, whereby the weakened color stripe signal is an indication of one of a plurality of content control conditions;

outputting the modified video signal with the weakened color stripe signal from the video receiver apparatus; and coupling the modified video signal to a detector in a compliant device to provide a command to inhibit recording, playback, transmission and or display of the modified video signal.

16. The method of claim 15, wherein the video receiver apparatus further receives the video signal or video file from one of an optical disc, a hard disc, a magnetic tape, or a solid state memory device.

17. The method of claim 15, wherein the output analog video signal conforms to an NTSC or PAL television standard.

18. The method of claim 15, further comprising detecting the command in the received video signal or video file.

19. The method of claim 15, wherein the weakened color stripe signal encodes one of a plurality of content control states.

20. The method of claim 15, wherein the command is received from a digital video storage medium.

21. The method of claim 15, wherein the command is received from a source external to the apparatus via a delivery network.

22. A video receiver apparatus which provides a content control indication in a video output signal, comprising:

an input port adapted to receive a video signal or video file from an external source;

a signal generator coupled to the input port and which generates, for selected scan lines of the video signal or video file, a weakened color stripe signal having an incorrect color burst for a horizontal blanking interval of the selected scan lines, wherein the incorrect color burst is detectable, but inadequate to prevent acceptable video tape recording of the video signal;

a processor coupled to combine the weakened color stripe signal with the video signal or video file;

an output port coupled to the processor for outputting the video signal, wherein the weakened color stripe signal in the output video signal is an indication of one of a plurality of content control conditions; and coupling the video signal to a detector in a compliant device to provide a command to inhibit recording, playback, transmission and or display of the video signal.

23. The apparatus of claim 22, further comprising at least one of an optical disc drive, a hard disc drive, a magnetic tape drive, or a solid state memory device and which is coupled to the input port.

24. The apparatus of claim 22, wherein the output analog video signal conforms to an NTSC or PAL television standard.

25. The apparatus of claim 22, wherein the incorrect color burst includes at least a first and a second portion, the first portion having subcarrier cycles of correct phase angle and the second portion having subcarrier cycles of incorrect phase angle.

26. The apparatus of claim 22, further comprising:

a control data reader or detector coupled to the signal generator and the input port and which detects a command in the received video signal or video file.

27. The apparatus of claim 22, wherein the weakened color stripe signal encodes one of the plurality of content control conditions which include record, play, transmission or display.

28. The apparatus of claim 22, wherein the signal generator is programmable from an external source via a delivery network.

* * * * *